United States Patent [19]

Yoshida

[11] Patent Number: 4,784,624
[45] Date of Patent: Nov. 15, 1988

[54] FISH FINDER OR DEPTH DETECTOR FOR MARINE PROPULSION

[76] Inventor: Shinji Yoshida, c/o 1400, Nippashi-cho, Hamamatsu-shi, Shizuoka-ken, Japan

[21] Appl. No.: 58,942

[22] Filed: Jun. 5, 1987

[30] Foreign Application Priority Data

Jun. 7, 1986 [JP] Japan .................. 61-132178
Jun. 7, 1986 [JP] Japan .................. 61-132179

[51] Int. Cl.$^4$ .................................. B60L 1/14
[52] U.S. Cl. .................................. 440/2; 440/77; 440/78; 440/113
[58] Field of Search ............... 440/113, 900, 2, 76–78; 367/99, 107, 108, 118; 181/124; 342/118

[56] References Cited

U.S. PATENT DOCUMENTS 1,738,772 12/1929 Harry ........................... 440/2
2,549,483 4/1951 Kiebhaefer ..................... 440/77

FOREIGN PATENT DOCUMENTS 55-55421 12/1980 Japan .

Primary Examiner—Sherman D. Basinger
Attorney, Agent, or Firm—Ernest A. Beutler

[57] ABSTRACT

Several embodiments of marine outboard drives including depth finders attached as a unit to the outboard drive. In each embodiment, the depth finder includes a transmitter/receiver that is carried by the lower unit in proximity to and beneath a cavitation plate for protection from underwater objects and for facilitating removal. The outboard drive is pivotally supported by a hollow steering shaft and a conductor extends through the hollow steering shaft for transmitting signals from the transmitter/receiver to a display that is mounted on the outer cowling. In some embodiments, the display is mounted on the front of the outer cowling and on others is pivotally supported on the top of the outer cowling. In all embodiments, the display is resiliently supported.

35 Claims, 9 Drawing Sheets

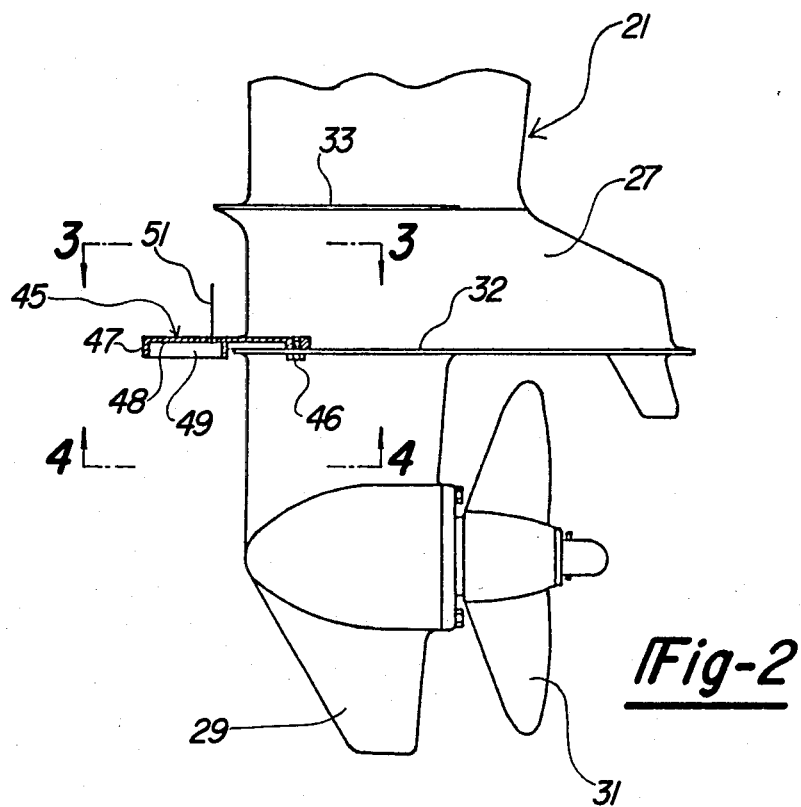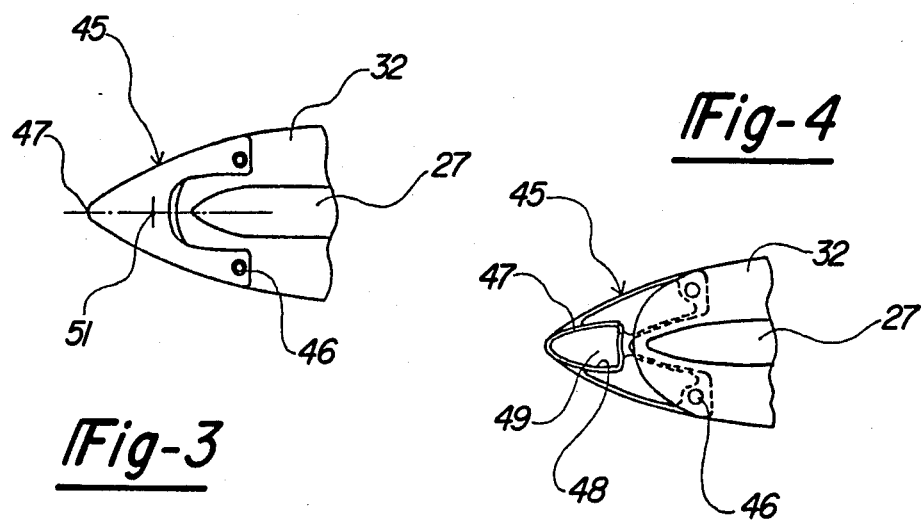

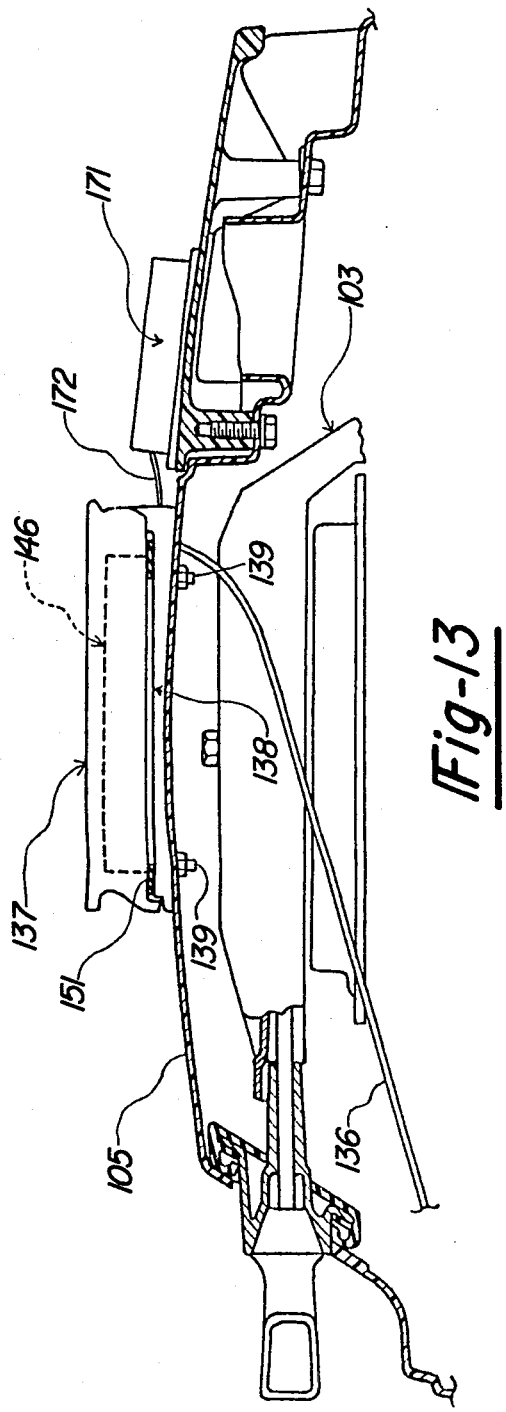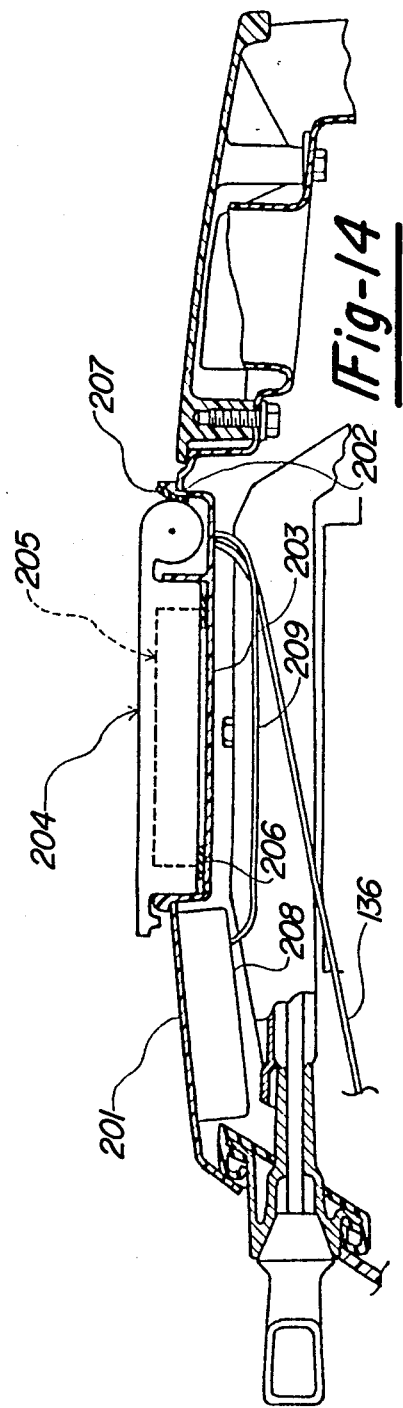

FISH FINDER OR DEPTH DETECTOR FOR MARINE PROPULSION

BACKGROUND OF THE INVENTION

This invention relates to a fish finder or depth detector for a marine propulsion device and more particularly to an improved, compact and highly effective depth finder for such a device.

In conjunction with watercraft it is a common practice to provide a device for finding depth or fish. Such devices operate like a sonar system and include a transmitter/receiver that emits signals which are reflected off the bottom of the water or fish to provide a signal and indication to the operator of the watercraft. Either depth finders or fish finders are generically referred in the specification and claims of this application as "depth finders". In connection with some type of watercraft, the transmitter/receiver and display are substantially separate items that must be mounted independently on the watercraft. Although this has advantages for permanent application, it does not afford an operator the ease of mounting the unit on individual and separate watercraft. Specifically, it is desirable to provide a completely self-contained unit that may be carried as a unit by the propulsion device of the watercraft and, accordingly, can be connected to the watercraft as a unit with the propulsion device.

It is, therefore, a principal object of this invention to provide a combined marine outboard drive and depth finder for attachment as a unit to a watercraft.

It is a further object of this invention to provide a combined outboard drive and depth finder wherein the outboard drive carries both the transmitter/receiver and also the display of a depth finder.

In conjunction with the mounting of the transmitter/receiver, it has been proposed to mount such unit in proximity to the propulsion unit of the outboard drive. One way that this can be done is to mount the transmitter/receiver in the skeg of the outboard drive. In this way, the transmitter/receiver is disposed at a sufficient depth so as to be unaffected by bubbles and turbulence caused by the passage of water along the bottom of the hull of the watercraft. However, in such a location the transmitter/receiver can easily become damaged if an underwater obstacle is struck.

It is, therefore, a further object of this invention to provide an improved mounting arrangement for the transmitter/receiver of a depth finder for an outboard drive.

It is a further object of this invention to provide an improved mounting arrangement for a transmitter/receiver which will not interfere with the water flow and also which will protect the device in the event underwater obstacles are struck.

Although there are advantages to mounting the transmitter/receiver in proximity to the propulsion unit, the propulsion unit can cause turbulence or create noise that will give rise to incorrect signals from the depth finder. However, if the transmitter/receiver is positioned remotely from the propulsion unit, there is the disadvantage that other turbulence created by the passage of the hull through the water will give erroneous signals.

It is, therefore, a further object of this invention to provide an improved mounting location and device for the transmitter/receiver of a depth finder on an outboard drive so as to provide good results and adequate protection for the unit.

In order to provide a unitary assembly and one which can be conveniently installed, there are advantages in providing the display of the depth finder so that it will be mounted on the outboard drive. However, because of the fact that the outboard drive contains a number of moving components which vibrate, there are disadvantages to such mountings for the display unit. That is, it is important to ensure that the display unit is not adversely affected by the vibrations occurring within the outboard drive.

It is, therefore, a still further object of this invention to provide an improved mounting arrangement for the display unit of a depth finder upon a marine outboard drive.

Many forms of marine outboard drives are mounted for movement relative to the hull of the associated watercraft. For example, the outboard drive may be mounted for pivotal movement about a vertically extending steering axis for steering of the outboard drive. In addition, the outboard drive may also be supported for pivotal movement about a horizontally disposed tilt axis for trim adjustment of the outboard drive. When it is necessary to transmit a signal from a transmitter/receiver to a display unit, it is important to ensure that this pivotal movement does not interfere with the conductors that convey the signal between the transmitter/receiver and the display unit.

It is, therefore, a still further object of this invention to provide an improved arrangement for transmitting signals between the components of a depth finder in a marine outboard drive.

SUMMARY OF THE INVENTION

A first feature of this invention is adapted to be embodied in a combined marine outboard drive and depth finder for attachment as a unit to a watercraft. The unit comprises an outboard drive that is adapted to be affixed to the transom of a watercraft and which carries propulsion means for propelling the watercraft. A transmitter/receiver for transmitting and receiving signals for determining depth is carried by the outboard drive. There is further provided in a display that is carried by the outboard drive for visually displaying the data obtained by the transmitter/receiver.

Another feature of the invention is adapted to be embodied in a marine outboard drive comprising an outer housing that is adapted to be attached as a unit to the watercraft and which carries propulsion means at its lower end. The outer housing defines a plate that extends in substantially horizontal relationship and which overlies at least in part the propulsion means. In accordance with this feature of the invention, a transmitter/receiver for transmitting and receiving signals for determining depth is carried by the outer housing in juxtaposition to the forward edge of the plate.

Another feature of the invention is also adapted to be embodied in a marine outboard drive that is adapted to be affixed to the transom of a watercraft. In accordance with this feature of the invention, the outboard drive includes a protective cowling and a display for a depth finder that is carried by the outer cowling.

Yet a further feature of the invention is also adapted to be embodied in an outboard drive for attachment to the transom of a watercraft. In accordance with this feature of the invention, the outboard drive includes a steering shaft that is journaled within a swivel bracket for steering movement of the outboard drive relative to the transom about a vertically extending axis. The steering shaft is hollow and a combined transmitter/receiver is carried by the lower portion of the outboard drive beneath the steering shaft. Conductor means extends from the transmitter/receiver through the hollow steering shaft for connection to a remotely positioned display.

BRIEF DESCRIPTION OF THE DRAWINGS

FIG. 2 is an enlarged side elevational view of the lower unit, with a portion broken away.

FIG. 3 is a cross sectional view taken along the line 3—3 of FIG. 2.

FIG. 4 is a cross sectional view taken along the line 4—4 of FIG. 2.

FIG. 13 is an enlarged cross sectional view, in part similar to FIG. 9, showing a further embodiment of the invention.

FIG. 14 is a cross sectional view, in part similar to FIGS. 9 and 13, showing yet another embodiment of the invention.

DETAILED DESCRIPTION OF THE PREFERRED EMBODIMENTS OF THE INVENTION

Embodiment of FIGS. 1–4

Figure 1:
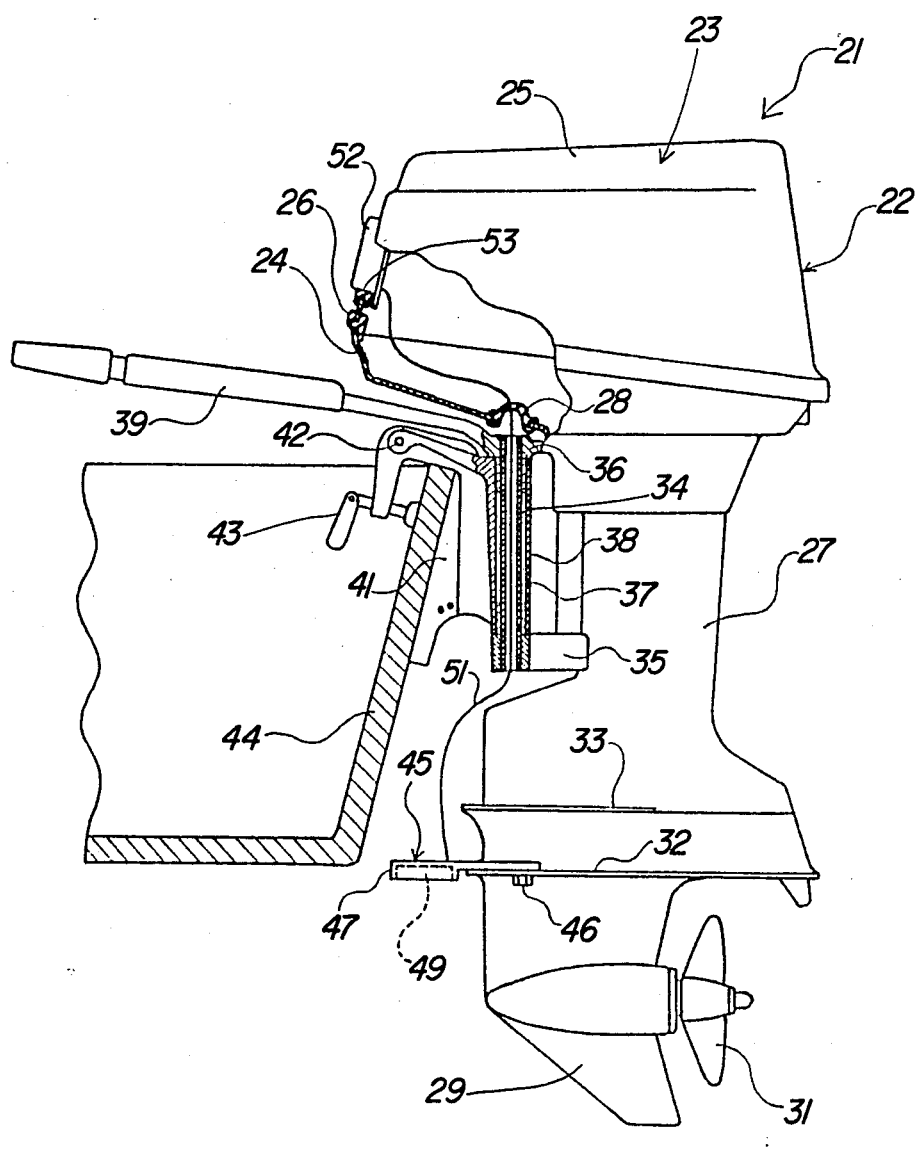
FIG. 1 is a side elevational view of an outboard motor constructed in accordance with a first embodiment of the invention, with portions broken away.

An outboard motor constructed in accordance with a first embodiment of the invention is indicated generally by the reference numeral 21. It should be understood that in each of the embodiments of the invention as specifically illustrated and described, the invention is adapted to be embodied in an outboard motor. It is to be understood, however, that a number of facets of the invention may be employed in connection with the outboard drive of an inboard/outboard drive unit. For that reason, the term outboard drive is used herein, including in the claims, generically to include either an outboard motor per se or the outboard drive portion of an inboard/outboard drive assembly.

The outboard motor 21 includes a power head indicated generally by the reference numeral 22 which comprises a powering internal combustion engine (not shown) that is surrounded by a protective cowling, which cowling is indicated at generally by the reference numeral 23. The protective cowling 23 may be formed from a suitable material such as molded fiberglass or the like and includes a lower tray portion 24 to which a main cover portion 25 is detachably affixed. A watertight seal 26 is carried around the periphery of the cover portion 25 and is engaged with the tray portion 24 so as to provide a relatively watertight seal around the engine of the power head 22.

A drive shaft (not shown) is driven by the engine of the power head and is rotatably journaled in a drive shaft housing 27. An elastomeric grommet 28 is carried by the inner periphery of the tray 24 for a purpose to be described.

A lower unit 29 depends from the drive shaft housing 27 and contains a forward, neutral, reverse transmission (not shown) that is driven by the drive shaft in a known manner. The forward neutral, reverse transmission of the lower unit 29 selectively drives a propeller 31 in either forward or reverse direction as is well known in this art.

The lower portion of the drive shaft housing 27 or the upper portion of the lower unit 29 is provided with a cavitation plate 32 which extends generally outwardly from the main body portion of the outboard drive and which is designed so as to preclude or reduce the likelihood of air becoming entrained with the water flowing across the propeller 31 for improving the propeller efficiency. In top plan view the anticavitation plate 32 has a generally tear-drop shape. Formed above the anticavitation plate 32 is an antisplash plate 33 which also has a generally tear-drop shape and which extends primarily only in a forward direction outwardly above the anticavitation plate 32. The antisplash plate 33 is designed so as to prevent water from splashing upwardly over the transom of the associated watercraft or onto the upper portions of the outboard motor 21.

A tubular steering shaft 34 is affixed to the drive shaft housing 27 by means of a lower supporting bracket 35 and an upper supporting bracket 36. The tubular steering shaft 34 is rotatably journaled within a support tube 37 that is, in turn, affixed to a swivel bracket 38. As a result, the outboard motor 21 may be steered about a vertically extending steering axis by means of the support for the steering shaft 34 in the tubular member 37 and swivel bracket 38. A tiller 39 is affixed to the upper end of the steering shaft 34 for permitting operator control of the steering.

The swivel bracket 38 is pivotally connected to a clamping bracket 41 by means including a horizontally extending pivot pin 42. This pivotal connection permits trim and tilt up movement of the outboard motor 21 relative to the clamping bracket 41 in a known manner and for a known purpose. The clamping bracket 41 is, in turn, affixed by means of a clamping assembly 43 to a transom 44 of an associated watercraft.

The construction of the outboard motor 21 as thus far described, except for the use of the hollow or tubular steering shaft 34 may be considered to be conventional. For that reason, those conventional components of the outboard motor 21 have been described only in as much detail as is necessary so as to understand the environment for the invention.

In accordance with the invention, the outboard motor 21 is also provided with a unitary depth or fish detecting device that has all of its components carried by the outboard motor 21 so that the outboard motor 21 and depth or fish detecting device (generically referred to as a "depth detector") forms a unit with the outboard motor and need not be separately attached. In addition, the device is mounted in such a way that the operator may easily review the data displayed by the depth detector and furthermore the transmitter/receiver of the depth detector is positioned in such a way so as to avoid false readings and also to protect the unit.

The depth detector comprises a transmitter/receiver assembly, indicated generally by the reference numeral 45, that is comprised of a supporting member having a configuration that forms a continuation of the cavitation plate 32 as clearly seen in FIGS. 3 and 4. For this reason, the cavitation plate 32 is cut away at its forward end so that this supporting member can be conveniently nested into it and attached thereto by means of connecting bolts 46. The supporting member has a forwardly extending edge 47 behind which is formed a recess 48. The recess 48 opens in a downward direction and receives a transmitter/receiver 49 of the depth detector. The transmitter/receiver 49 is, therefore, protected by the supporting member and is also disposed so that it can be conveniently replaced in the event that it does become damaged. However, because the transmitter/receiver assembly 45 is positioned well above the lower end of the lower unit 29 and specifically the skeg and in proximity to the lower edge of the transom 44, the likelihood of it being damaged by floating or submerged objects will be substantially reduced. Therefore, the device is very safe. Furthermore, because of its mounting on the underside of the anticavitation 32 there is not the likelihood of air bubbles or turbulence across the transmitter/receiver 49 that will give false or erroneous signals caused by noise.

A conductor 51 or a series of conductors convey the signals to and from the transmitter/receiver 49 upwardly to the power head 21. The conductor 51 extends through the interior of the hollow steering shaft 34 and hence it will not be likely to be chaffed or damaged due to the steering movement of the outboard motor 21. The conductor 51 extends through the upper end of the steering shaft 34 and passes through the grommet 28 to enter into the protective cowling 23. The upper end of the conductor 51 is connected to a display unit 52 which is, in accordance with this embodiment, mounted in the main cowling portion 25 in its forward face. An elastic gasket 53 forms the support for the display member 52 so as to resiliently support it and to avoid vibrations being transmitted to the display unit 52 so as to improve its readability and to ensure against any errors in the output signal. It should be noted that the display unit 52 is conveniently positioned in proximity to the operator so that he may easily read the signal from the transmitter/receiver 49. The actual form of the display unit 52 may be of any known type in this art.

Figure 5:
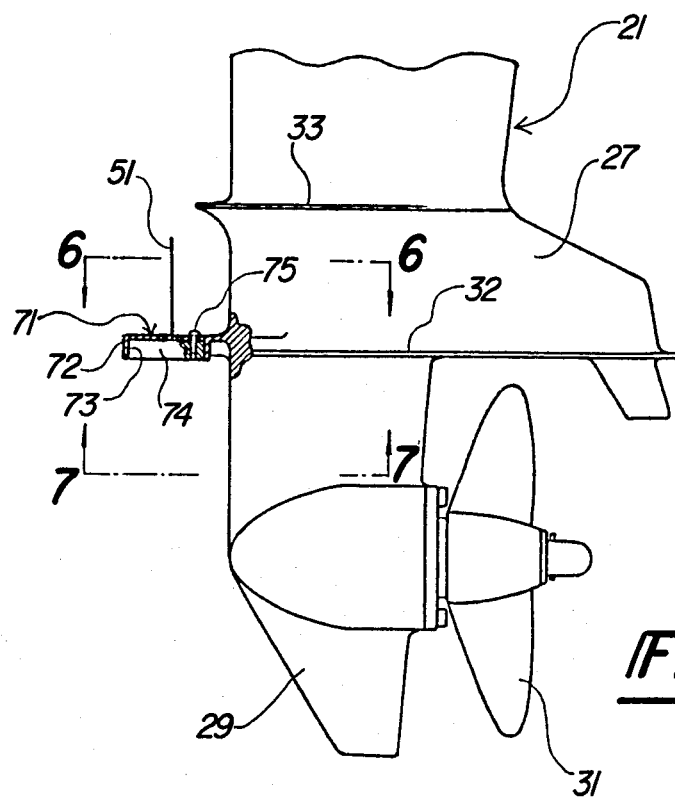
FIG. 5 is a side elevational view, in part similar to FIG. 2, showing the lower unit of a marine outboard drive constructed in accordance with a second embodiment of the invention.
Figure 6:
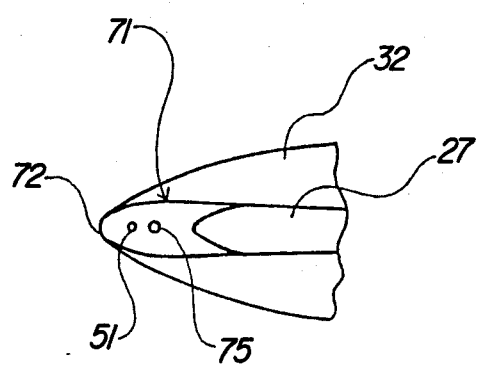
FIG. 6 is a cross sectional view taken along the line 6—6 of FIG. 5.
Figure 7:
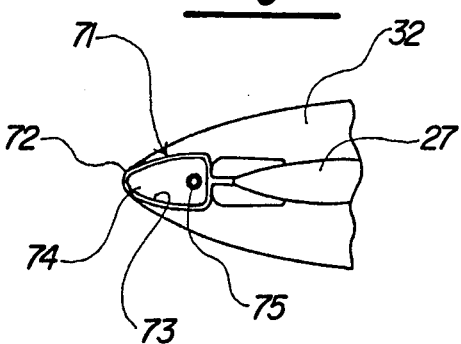
FIG. 7 is a cross sectional view taken along the line 7—7 of FIG. 5.

Embodiment of FIGS. 5–7

This embodiment is basically the same as the embodiment of FIGS. 1–4 and, for that reason, only the differences between this embodiment and the previously described embodiment will be described and have been illustrated.

In this embodiment, a combined transmitter/receiver unit is indicated generally by the reference numeral 71. The transmitter/receiver unit 71 includes a mounting body that is formed integrally with the drive shaft housing 27 and which includes a forwardly extending portion 72 of generally tear-drop shape. The portion 72 defines a downwardly opening recess 73. An ultrasonic transmitter/receiver assembly 74 is contained within the recess 73 and is detachably affixed thereto by means of a threaded fastener 75. Hence, with this embodiment only the transmitter/receiver assembly 74 is removable with the remaining portions of the assembly being formed integrally with the lower unit and drive shaft housing. However, this device has substantially the same advantages of the previously described embodiment.

Embodiment of FIGS. 8–12

An outboard motor constructed in accordance with yet another embodiment of the invention is identified generally by the reference numeral 101. Outboard motor 101 includes a power head, indicated generally by the reference numeral 102, which is comprised of an internal combustion engine 103 (FIG. 9) and a surrounding protective cowling. The protective cowling, as with the embodiment of FIGS. 1–5, is comprised of a lower tray portion 104 and an upper main body portion 105. The tray portion 104 is formed with a peripheral flange 106 that is engaged by a sealing assembly 107 carried at the periphery of the main body portion 105 for effecting a watertight seal. A latch mechanism, comprised of a rotatably supported latching member 108 and fixed keeper 109, detachably affix the main body portion 105 to the tray 104.

The engine 103 drives a drive shaft 111 that is rotatably journaled in a known manner within a drive shaft housing 112 that depends from the power head 102. The tray 104 carries a seal 113 that is engaged with the upper end of the drive shaft housing 112 to provide a seal against water entry.

A lower unit 114 depends from the drive shaft housing 112 and carries a forward, neutral, reverse transmission (not shown) that drives a propeller 115 in a known manner.

As with the previously described embodiments, a tubular hollow steering shaft 116 is affixed to the drive shaft housing 112 by an upper bracket 117 and a lower bracket 118. The steering shaft 116 is, in turn, journaled within a swivel bracket 119 in the previously described manner. The swivel bracket 119 is, in turn, pivotally connected by means of a pivot pin 121 to a clamping bracket 122. The clamping bracket 122 carries a clamping means 123 for affording a detachable connection to a transom 124 of a watercraft 125.

A tiller 126 is affixed to the upper end of the steering shaft 116 for steering of the outboard motor 102 in a known manner.

In accordance with this embodiment of the invention, the outboard motor 101 further includes an integral depth finder which forms a unit with it. This depth finder includes a transmitter/receiver 127 that is carried by the lower portion of the driver shaft housing 112 by means including a supporting bracket 128. This assembly may take the form of either the embodiment of FIGS. 1–4 or the embodiment of FIGS. 5–7. Alternatively, other mounting arrangements may be employed with this embodiment.

One or more conductors 129 extend upwardly from the transmitter/receiver 127 and pass through the hollow steering shaft 116. The conductors 129 enter the interior of the protective cowling where they pass through a grommet 131 carried by the tray 104 to ensure for good sealing. The conductor 131 is looped, as at 132, within the protective cowling so as to permit the main body portion 105 to be removed without disconnecting the connector. A quick disconnect electrical connector comprised of a male portion 133 and a female portion 134 as supported by the main body portion through a clamp 135 to permit disassembly. The female connector 134 connects the conductor 129 to a further conductor 136 which extends to the top of the main body portion 105 wherein a display assembly, indicated generally by the reference numeral 137, is supported.

Figure 12:
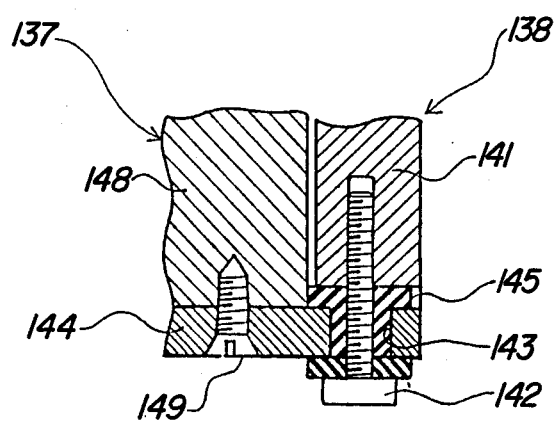
FIG. 12 is an enlarged cross sectional view taken along the line 12—12 of FIG. 9 and shows the hinge construction for the display member.

The display 137 is supported on the upper side of the top of the main cowling body portion 105 by means of a suporting bracket 138 that is affixed to the cowling portion 105 by means of fasteners 139. The bracket 138 has an upwardly extending rear portion, indicates generally by the reference numeral 141, that is defined rearwardly of a cavity 142 into which the display 137 is adapted to be nested when a display 137 is in a retaracted nonviewing position. A solar battery 140 is positioned in the cavity 142 for powering the device. The display 137 is pivotally supported by means of a resilient hinge assembly as best shown in FIG. 12 which comprises a threaded fastener 142 that passes through an enlarged opening 143 formed in a side plate 144of the display 137. A resilient grommet 145 is positioned between the opening 143 and the fastener 142 so as to provide a resilient hinge connection between the display 137 and the bracket 138.

Display 137 comprises a display plate 146 which may be of the liquid crystal type which is supported by the side plate 144. A printed circuit board 147 underlies the display plate 146 and provides the circuit for operating the display and processing the signals from the transmitter/receiver unit 127. A display plate 146 and circuit board 147 are contained within a main body portion 148 that is affixed to the arm 144 by means of threaded fasteners 149.

An elastic gasket 151 is sealingly engaged by a base plate 152 that is affixed to the body portion 148 in a known manner and resiliently supports and seals against the bracket 138 when the display 137 is pivoted into its closed position.

Figure 8:
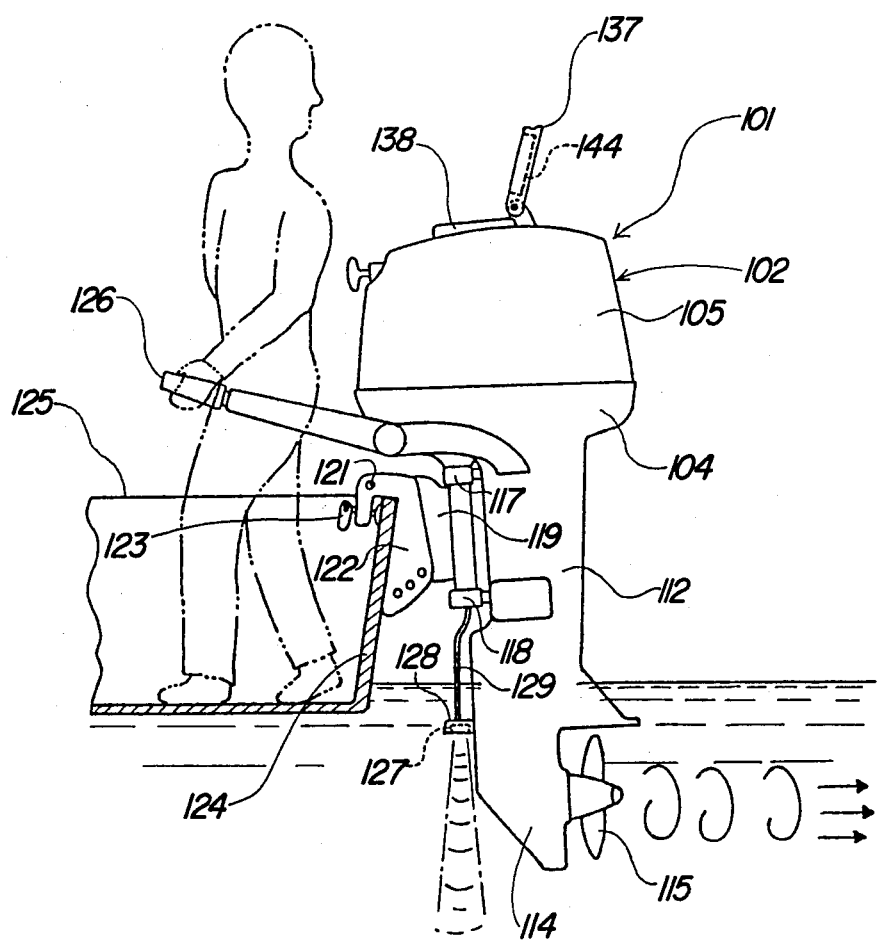
FIG. 8 is a side elevational view, in part similar to FIG. 1, showing another embodiment of the invention, with a portion broken away.
Figure 9:
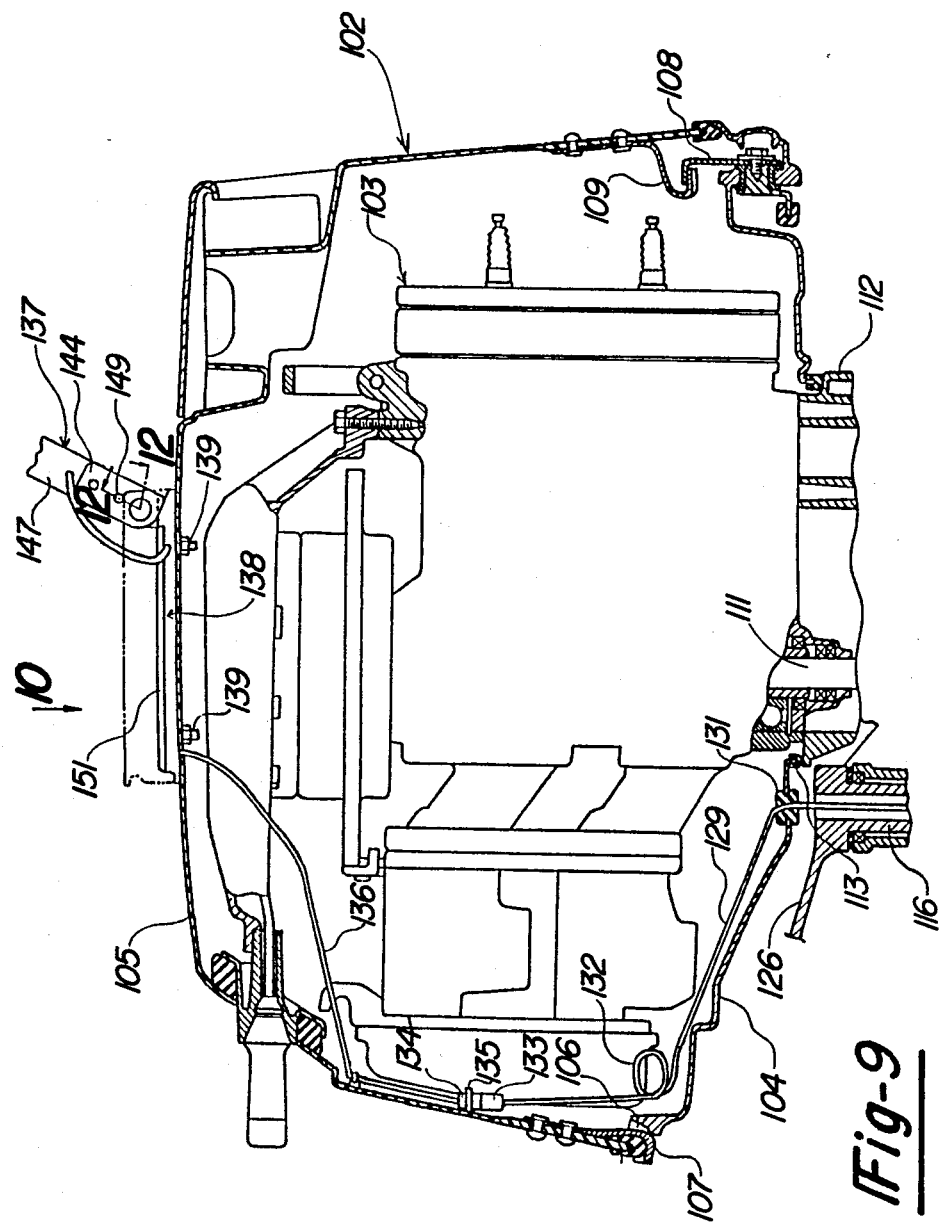
FIG. 9 is an enlarged cross sectional view showing the power head of the outboard drive of the embodiment of FIG. 8.
Figure 10:
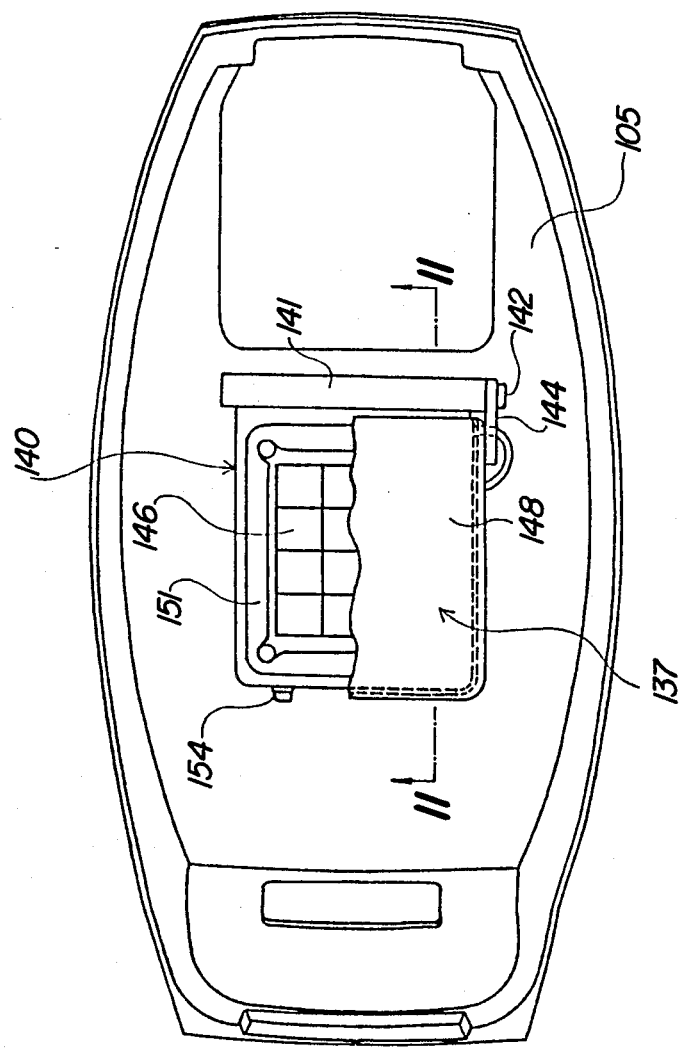
FIG. 10 is a top plan view looking generally in the direction of the arrow 10 in FIG. 9.
Figure 11:
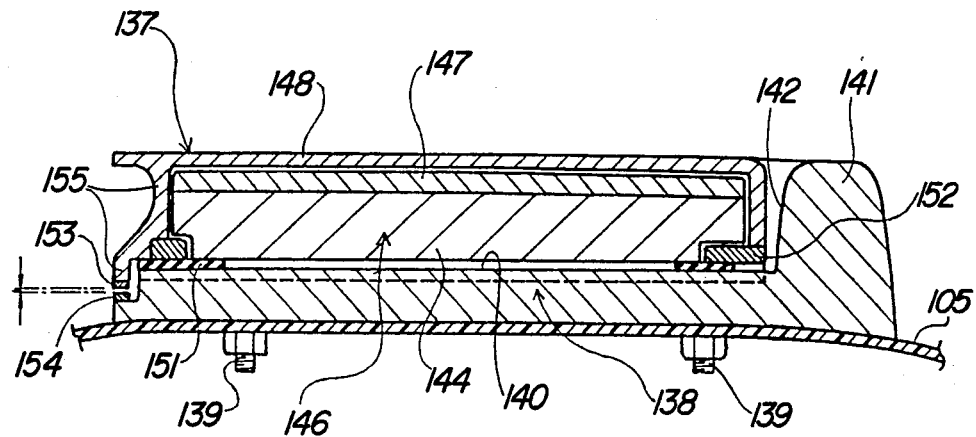
FIG. 11 is an enlarged cross sectional view taken along the line 11—11 of FIG. 10.

A latching mechanism comprised of a pair of magnetic elements 153 and 154 are carried by the body portion 148 and bracket 138 to normally accomplish sealing. There is a small clearance C between these latching members which is maintained by the compression of the gasket 151. A finger recess 155 is disposed so as to permit the operator to grasp the display 137 and pivot it from its retracted position as shown in FIG. 11 and in the phantom-line view of FIG. 9 to its opened or displayed position as shown in FIG. 8 and in the solid-line view of FIG. 9.

It should be readily apparent that this embodiment of the invention provides that the display 146 will be disposed in proimity to an operator's (M) eyes when the display 137 is pivoted to its viewing position and hence will provide easy viewing. In addition, because of the resilient support for the display, it will not be likely to be damaged, will be easy to read and will not pick up stray signals. Also, this embodiment has the advantages of the previously described embodiment and in further addition the display can be protected by folding it down to its storage position when it is not in use. This will protect both the display and solar battery 140 when not in use and increase their useful life. When the display is up in use the solar battery 140 will be exposed to provide the necessary power to operate the device.

Embodiment of FIG. 13

FIG. 13 shows an embodiment of the invention which is substantially the same as the embodiment of FIGS. 8-12. For that reason, those components which are the same as the components of the previously described embodiment have been identified by the same reference numerals and will not be described again, except insofar as is necessary to understand the construction and operation of this embodiment.

It should be noted that the previously described embodiments have not illustrated or described the electrical power source for the depth finder. This is because the power source may take any known type and may, in fact, receive electrical power from the main power system of the outboard motor. In the embodiment of FIG. 13, electrical power is provided by means of a solar battery 171 that is affixed to the upper portion of the main cowling portion 105 in a suitable manner. A conductor 172 conducts electrical power from the solar battery 171 to the remaining components of the depth finder. In all other regards, this embodiment is the same as the previously described embodiments.

Embodiment of FIG. 14

FIG. 14 shows another embodiment of the invention which is generally similar to the embodiments of FIGS. 8-12 and FIG. 13. In this embodiment, the main cowling body portion, indicated generally by the reference numeral 201, is formed with a central opening 202. A supporting bracket 203 has a detachable connection within the opening 202. The display member, indicated generally by the reference numeral 204, may take the form of the embodiment of FIGS. 8-12 and is pivotally supported within the bracket 203 by a flexible hinge, as aforedescribed. The actual display 205 is carried by the member 204 and is adapted to sealing engage a gasket 206 when the member is pivoted to its closed position. A frictional elastomeric member 207 engages the member 204 so as to retain it in either its opened or its closed position and also so as to absorb vibrations.

In this embodiment, a powering electrical battery 208 is contained within the protective cowling portion 201 and is connected by means of a conductor 209 to the display 204.

Figure 15:
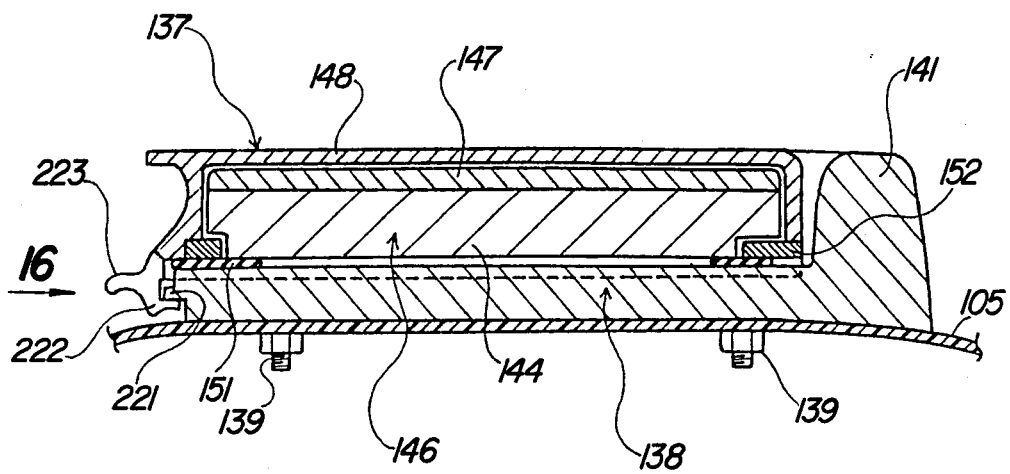
FIG. 15 is a further enlarged cross sectional view, in part similar to FIG. 11, showing yet another embodiment of the invention and is taken generally along the line 15—15 of FIG. 16.
Figure 16:
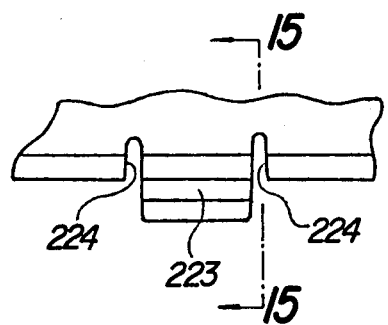
FIG. 16 is an elevational view looking in the direction of the arrow 16 in FIG. 15 and shows the latching mechanism.

Embodiment of FIGS. 15 and 16

FIGS. 15 and 16 show another embodiment of this invention which is generally similar to the embodiment of FIGS. 8-12. This embodiment differs from the previously described embodiment only in the form of the latching mechanism and for that reason all components which are the same as those of the previously described embodiment have been identified by the same reference numerals and will not be described again in detail.

In this embodiment, the bracket 138 is formed with an out-turned flange 221. The flange 221 is adapted to be engaged by a resilient jaw 222 of the mounting member 148. This jaw has an extending portion 223 that is adapted to be grasped by the finger of an operator so that it can be deflected and operate as an integral, resilient latch. The member 222 is separated from the remainder of the body portion by means of a pair of cutouts 224 so that there will be sufficient flexibility for its movement between the latched position as shown in FIG. 15 and a released position wherein the jaw 222 is clear of the flange 221 and the display 146 can be pivoted to its displayed position.

It should be readily apparent from the foregoing description that a number of embodiments of the invention have been illustrated and described in each of which the depth finder is conveniently mounted as a unit with the outboard motor. In each embodiment, the display is mounted in a resilient matter on the outer cowling of the power head of the outboard drive so as to provide a good visual position for it and also so that it will be easily read without erroneous signals from noise and vibration. In addition, the transmitter/receiver is positioned in an area so that it will not pick up false signals and also will be protected. Although a number embodiments of the invention have been illustrated and described, various changes and modifications may be made without departing from the spirit and scope of the invention, as defined by the appended claims.

I claim:

1. A combined marine outboard drive and depth finder for attachment as a unit to a watercraft comprising an outboard drive adapted to be affixed to the transom of a watercraft, propulsion means carried by said outboard drive for propelling the watercraft, a transmitter/receiver for transmitting and receiving signals for detecting depth carried by said outboard drive, and a display carried by said outboard drive for visually displaying the data obtained by said transmitter/receiver.

2. A combined marine outboard drive and depth finder as defined in claim 1 wherein the outboard drive comprises an outboard motor.

3. A combined marine outboard drive and depth finder as defined in claim 1 wherein the outboard drive is supported for steering movement about a vertically extending steering axis.

4. A combined marine outboard drive and depth finder as defined in claim 3 wherein the steering axis is defined by a tubular steering shaft and a conductor from the transmitter/receiver to the display passes through the hollow interior of said steering shaft.

5. A combined marine outboard drive and depth finder as defined in claim 4 wherein the outboard drive includes an outer cowling and the display is mounted upon the outer cowling.

6. A combined marine outboard drive and depth finder as defined in claim 5 wherein the display is mounted on the front face of the outer cowling.

7. A combined marine outboard drive and depth finder as defined in claim 6 wherein the display is resiliently supported by the outer cowling.

8. A combined marine outboard drive and depth finder as defined in claim 5 wherein the display is mounted on the top face of the outer cowling.

9. A combined marine outboard drive and depth finder as defined in claim 8 wherein the display is pivotal between a retracted position wherein the display is not viewed and a viewing position wherein the display faces forwardly.

10. A combined marine outboard drive and depth finder as defined in claim 9 wherein the pivotal support is a resilient support.

11. A combined marine outboard drive and depth finder as defined in claim 3 wherein the outboard drive includes an outer cowling and the display is mounted upon the outer cowling.

12. A combined marine outboard drive and depth finder as defined in claim 11 wherein the display is mounted on the front face of the outer cowling.

13. A combined marine outboard drive and depth finder as defined in claim 12 wherein the display is resiliently supported by the outer cowling.

14. A combined marine outboard drive and depth finder as defined in claim 11 wherein the display is mounted on the top face of the outer cowling.

15. A combined marine outboard drive and deph finder as defined in claim 14 wherein the display is pivotal between a retracted position wherein the display is not viewed and a viewing position wherein the display faces forwardly.

16. A combined marine outboard drive and depth finder as defined in claim 15 wherein the pivotal support is a resilient support.

17. A combined marine outboard drive and depth finder as defined in claim 1 further including a cavitation plate formed adjacent to and above the propulsion means and wherein the transmitter/receiver is supported in juxtaposition to the forward periphery of the cavitation plate.

18. A combined marine outboard drive and depth finder as defined in claim 17 wherein the support for the transmitter/receiver comprises a forwardly extending projection of the cavitation plate.

19. A combined marine outboard drive and depth finder as defined in claim 18 wherein the transmitter/receiver is detachably connected to the cavitation plate.

20. A combined marine outboard drive and depth finder for attachment as a unit to a watercraft comprising an outboard drive adapted to be affixed to the transom of a watercraft, propulsion means carried by said outboard drive for propelling the watercraft, a cavitation plate extending above said propulsion means for precluding cavitation, a transmitter/receiver for transmitting and receiving signals for detecting depth carried by said cavitation plate at a forward edge thereof.

21. A combined marine outboard drive and depth finder as defined in claim 20 wherein the support for the transmitter/receiver comprises a forwardly extending projection of the cavitation plate.

22. A combined marine outboard drive and depth finder as defined in claim 21 wherein the transmitter/receiver is detachably connected to the cavitation plate.

23. A combined marine outboard drive and depth finder as defined in claim 20 wherein the propulsion means comprises a propeller.

24. A combined marine outboard drive and depth finder as defined in claim 23 wherein the support for the transmitter/receiver comprises a forwardly extending projection of the cavitation plate.

25. A combined marine outboard drive and depth finder as defined in claim 24 wherein the transmitter/receiver is detachably connected to the cavitation plate.

26. A combined marine outboard drive and depth finder for attachment as a unit to a watercraft comprising outboard drive adapted to be affixed to the transom of a watercraft, propulsion means carried by said outboard drive for propelling the watercraft, an outer cowling for said outboard drive, and a display for displaying depth signals carried by said outboard drive.

27. A combined marine outboard drive and depth finder as defined in claim 26 wherein the display is supported by the outer cowling.

28. A combined marine outboard drive and depth finder as defined in claim 27 wherein the display is resiliently supported by the outer cowling.

29. A combined marine outboard drive and depth finder as defined in claim 28 wherein the display is carried by a front face of the outer cowling.

30. A combined marine outboard drive and depth finder as defined in claim 28 wherein the display is supported by the top of the outer cowling.

31. A combined marine outboard drive and depth finder as defined in claim 30 wherein the display is pivotally supported by the outer cowling for movement between a storage position and a display position.

32. A combined marine outboard drive and depth finder as defined in claim 31 further including latching means for holding the display in its storage position.

33. A combined marine outboard drive and depth finder as defined in claim 32 wherein the latching means comprises a magnet.

34. A combined marine outboard drive and depth finder as defined in claim 32 wherein the latching means comprises an integral, resilient element.

35. A combined marine outboard drive and depth finder for attachment as a unit to a watercraft comprising an outboard drive adapted to be attached to a transom of a watercraft for steering movement about a generally vertically extending steering axis, said steering axis being defined in part by a hollow steering shaft affixed to said outboard drive, a transmitter/receiver carried by said outboard drive for transmitting and receiving signals for determining depth, and conductor means extending from said transmitter/receiver through said steering shaft to a remotely positioned display.

* * * * *